US005376700A

United States Patent [19]

Yamazaki et al.

[11] Patent Number: 5,376,700

[45] **Date of Patent: * Dec. 27, 1994**

[54] RUBBER COMPOSITION

[75] Inventors: Hirotaka Yamazaki; Yasunori Fukuta; Yoshihide Fukahori, all of Tokyo, Japan

[73] Assignee: Bridgestone Corporation, Tokyo, Japan

[ * ] Notice: The portion of the term of this patent subsequent to Nov. 10, 2009 has been disclaimed.

[21] Appl. No.: 54,274

[22] Filed: Apr. 30, 1993

[30] Foreign Application Priority Data

May 27, 1992 [JP] Japan .................................. 4-134657

[51] Int. Cl.$^5$ ............................ C08K 9/10; C08K 9/12

[52] U.S. Cl. .................................... 523/210; 523/150; 523/152; 523/209; 523/212; 523/213; 523/216; 524/430

[58] Field of Search ............... 523/209, 150, 152, 153, 523/210, 212, 213, 214, 216, 217; 524/430

[56] References Cited

U.S. PATENT DOCUMENTS

| | | | |
|---|---|---|---|
| 2,011,496 | 8/1935 | Lüchinger | 106/23 |
| 2,143,897 | 1/1939 | Oriola | 106/23 |
| 3,878,147 | 4/1975 | Craven | 260/18 R |
| 5,162,395 | 11/1992 | Yamazaki et al. | 523/209 |

FOREIGN PATENT DOCUMENTS 2447614 4/1975 Germany .

*Primary Examiner*—Paul R. Michl
*Assistant Examiner*—U. K. Rajguru
*Attorney, Agent, or Firm*—Kanesaka & Takeuchi

[57] ABSTRACT

A rubber composition in which highly hard particles formed with a rubber-philic coating layer by a fluidized coating treatment are dispersed in a rubber material.

9 Claims, 1 Drawing Sheet

1B
1
4
2
3
1A

RUBBER COMPOSITION

FIELD OF THE INVENTION

The present invention concerns a rubber composition and, more in particular it relates to a rubber composition having a high frictional force on a frozen road surface or a surface of a road with hydrous membrane, having excellent abrasion resistance and suitable to materials for tire treads or shoe soles.

DESCRIPTION OF THE RELATED ART

When a vehicle runs on a road surface at a low temperature during winter season, particularly, on a road surface on which water or snow is frozen to form an ice surface, the frictional force between a tread rubber of a tire mounted to the vehicle and ice is remarkably lower than the frictional force on a usual not iced dry road surface. Therefore, for the sake of safety running of the vehicle on a frozen road surface, the frictional force between the tread rubber of the tire and the ice is kept from lowering by mounting spiked tires on the vehicle or attaching tire chains to the outer circumference of the tires. However, in a case of mounting tires attached with the tire chain or spiked tires on the vehicle, if the vehicle runs along a curve or suddenly starts or stops, spikes of the spiked tires or the tire chains damage the road surface. Then, injured road surface is partially cut into powder, which is blown up and scatters dusts by wind when the road surface is dried up. Further, when a vehicle having the spike tires or chained tires mounted thereon runs on the road surface, the spikes of the tires or the tire chains hit the road surface to bring about a problem of generating noises.

In view of the above, technique of providing an improvement to the tread rubber itself for enhancing the frictional force has been adopted in recent years. As a first method, a tread rubber is caused to blow by an appropriate means thereby forming closed cells (refer to Japanese Patent Laid-Open Sho 63-89547). That is, since the surface of the thus obtained tread rubber is covered with a great number of pores, it can provide high frictional characteristics on ice by a suction effect to the iced surface, water absorbing effect and development of energy loss accompanying micro movement of the pores. This method has already been adopted in actual tire treads and products are now commercialized as studless tires. In addition, there has also been studied for a method of mixing various kinds of obstacles (for example, natural products such as sands or chaffs) to a tread rubber and forming pores by dropping of such obstacles during running of tires. This method is identical with the above-mentioned method due to blowing, in view of the mechanism for increasing the frictional force on ice.

As a second method, various kinds of highly hard materials are mixed in a tread rubber for attaining an improvement to the frictional force on ice of the tread rubber by utilizing the scraping effect of the highly-hard material to the iced surface (Japanese Patent Publication Sho 46-31732, Japanese Patent Laid-Open Sho 51-147803 and Japanese Patent Publication Sho 56-52057). This is a method of increasing the frictional force on ice of the tread rubber by a mechanism quite different from that in the first method. Actually, as the highly hard material is mixed more, the frictional force on ice of the tread rubber is tended to be increased.

By the way, for the rubber material to be in contact, for example, with the road surface, it is an essential condition that the intended performance can be satisfied and, in addition, the abrasion resistance is excellent. That is, even is the frictional force on ice is excellent, if the abrasion resistance is poor, it lacks in practical usefulness as a tread rubber.

However, none of the existent methods described above can obtain a rubber material having both high frictional force on ice and high abrasion resistance together. Compatibility between the high frictional force on ice and high abrasion resistance is extremely difficult also in a case of a rubber incorporated with the highly hard material and it is said that such characteristics are considered to cause inevitable confliction between each other.

OBJECTS AND SUMMARY OF THE INVENTION

An object of the present invention is to overcome the foregoing problems in the prior art and provide a rubber composition of high characteristics having high frictional force on ice and high abrasion resistance together.

The present invention provides a rubber composition in which highly hard particles are dispersed in a rubber material, wherein a coating layer being affinity to rubber is formed to the highly hard particles by a fluidized coating treatment.

That is, the present invention is basically based on the above-mentioned second method, but it has a remarkable unique feature in the method of reinforcing the rubber with the highly hard material, more specifically, in the surface treatment method for the highly hard particles to be blended.

DESCRIPTION OF THE PREFERRED EMBODIMENTS

Description will now be made specifically to the present invention with reference to the drawings.

Figure 1A:
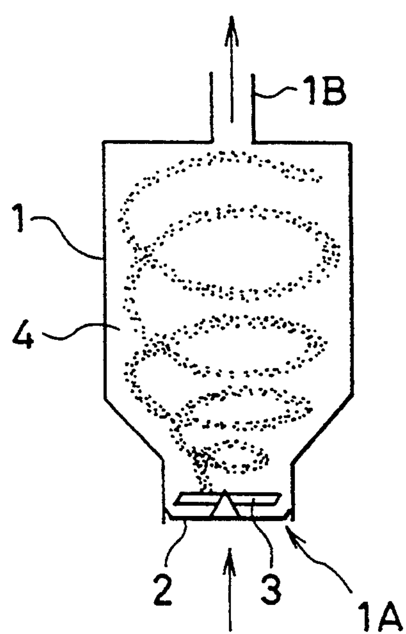
FIGS. 1(A) and 1(B) are schematic cross sectional views illustrating one embodiment of a fluidized coating device used for forming a coating layer having affinity to rubber by a fluidized coating method according to the present invention.
Figure 1B:
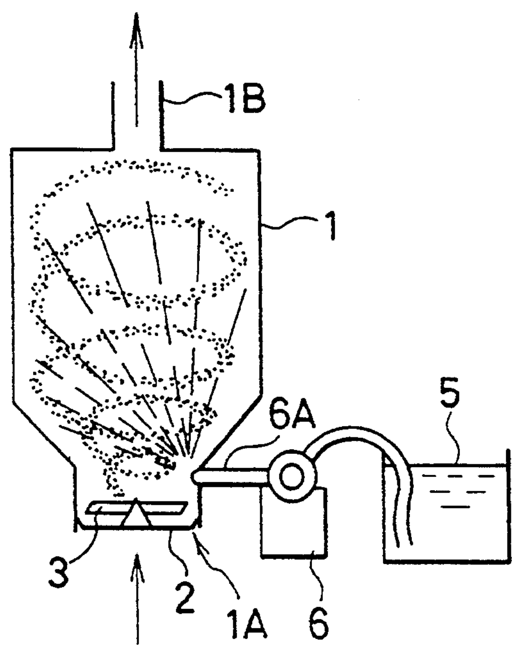

FIGS. 1(A) and 1(B) are schematic cross sectional views illustrating an embodiment of a fluidized coating device used for forming a coating layer having affinity to rubber by a fluidized coating method according to the present invention.

In the illustrated device, rotational flow caused by the rotation of a rotating disc 2 and a rotating blade 3 disposed to the bottom in a vessel 1, and swirling flow caused by a hot blow sent from a bottom 1A to the inside of the vessel 1 and discharged out of a top exit 1B thereof are given in combination to particles to be coated and charged in the vessel 1. This enables to create homogeneous particle fluidized bed at high concentration (a layer in which individual particles are raising and flowing with no coagulation) 4 in the vessel (FIG. 1(A)). Then, when a coating solution 5 is sprayed from a jetting device 6 disposed by inserting an injection nozzle 6A to the lower portion of the vessel, the particles are completely coated at the entire surface thereof with the coating solution in a state not colliding against each other and not providing surface and rearface to the jetting stream of the spray solution. At the same time, since the particles are dried by the hot blow, particles firmly coated individually with the coating material free from coagulation can be manufactured (FIG. 1(B)).

Formation of the uniform particle fluidized bed at a high concentration is indispensable for attaining uniform and firm coating, which is enabled, for the first time, by the combination of the rotating flow formed by the rotation of the rotating disc and the rotating blade and the swirling flow formed by blowing from the bottom of the vessel and sucking and discharging from the top exit of the vessel. This enables to form a uniform particle fluidized bed at high concentration even for particles of a great specific gravity such as ceramic particles and particles of large grain size (about 20 mesh), so that highly hard particles having uniform and firm coating layer can be manufactured.

According to this device, since the coating layer can be formed gradually on the surface of the particles by repeating coating and drying, even such a coating solution as having a high viscosity and can not be sprayed as it is, can be used by diluting and applying it little by little so as to increase the thickness of the coating layer gradually. In addition, the thickness of the coating material layer can optionally be controlled easily.

In this way, by the fluidized coating method using the device, for example, as shown in FIG. 1(A) and FIG. 1(B), it is possible to coat and form a coating layer having affinity to rubber which is most suitable to bonding with a matrix rubber, to highly hard particles having no bondability to rubber and both of the characteristics, that is, the high frictional force on ice and high abrasion resistance of the rubber composition in which the particles are blended can be improved.

In a case of forming a coating layer having affinity to rubber by a fluidized coating method using a fluidized coating device shown in FIG. 1, specifications of the device and treating conditions vary depending on the kind or particle size of the highly hard particles to be treated, the viscosity of the coating solution used, the thickness of the coating layer to be formed or the like and can not be defined generally. For example, the treatment is, preferably, conducted under the following conditions.

Number of rotation of rotating disc: 400–450 rpm
Number of rotation of rotating blade: 450–500 rpm
Temperature of hot blow: 50°–70° C.
Flow velocity of hot blow: 0.4–0.5 $m^3$/min
Viscosity of coating solution: 50–100 cp
Injection amount of coating layer: 10–20 ml/min The rotating directions of the rotating disc and that of the rotating blade are preferably be opposite to each other.

Description will now be made to the highly hard particles according to the present invention.

The highly hard particles used in the present invention are, preferably, highly hard particles having Vickers hardness (Hv) of greater than 20 and any of organic and inorganic materials may be used so long as they have such a hardness. Specifically, there can be mentioned, for example, ceramics such as $Al_2O_3$, ZnO, $TiO_2$, SiC, Si, C, $SiO_2$, ferrite, zirconia and MgO; metals such as Fe, Co, Al, Ca, Mg, Na, Cu and Cr, as well as alloys, brass, stainless steel or the like made of such metals and, in addition, nitrides, oxides, hydroxides, carbonates, sulfates, etc. of such metals, as well as natural products, for example, pulverizates of glass, carbon, carborundum, mica, zeolite kaolin, asbestos, montmomorlllonite, bentonite, graphite, silica, sand, silicic sand, wood, sirasu balloon, coal, and rock and, further, various kinds of plastics.

As suitable plastics, there can be mentioned thermoplastic materials such as polystyrene, polyethylene, polypropylene, ABS, polyvinyl chloride, polymethyl methacrylate, polycarbonate, polyacetal, nylon, polyether chloride, polytetrafluoroethylene, acetyl cellulose and ethyl cellulose, as well as thermosetting plastics such as phenol resin, urea resin, alkyd resin, unsaturated polyester, epoxy resin and melamine.

The highly hard particles may be solid, hollow or foamed products (porous material).

As has been described above, the Vickers hardness (Hv) of the highly hard particles is preferably greater than 20, more preferably, greater than 150 and particularly preferably, greater than 500. Accordingly, in view of the hardness, there can be mentioned, more preferably, hard plastics, metals and ceramics and, particularly preferably, metal oxide ceramics such as silica, glass, $SiO_2$ and $Al_2O_3$ among specific examples described above.

Further, the particle size of the highly hard particles is desirably between 20 and 800 mesh, more preferably, between 30 and 500 mesh, and, particularly preferably, between 50 and 400 mesh.

When a coating layer having affinity to rubber is formed on the surface of the highly hard particles as described above for improving the bondability with a rubber material to which the particles are blended, there can be mentioned a method of coating an adhesive capable of firmly bonding to the rubber material and the highly hard particles. In this case, not only an adhesive capable of bonding firmly with both of them, but also two kinds of adhesives each capable of bonding firmly to one of them may be combined to apply a 2-layer coating. That is, an adhesive layer capable of firmly bonding with the rubber material may be formed through an adhesive layer capable of firmly bonding with the highly hard particles.

It will be also effective to apply a coating on the highly hard particles with a rubber material for adhesive. In this case, the rubber material for adhesive may be a rubber material as a matrix or a rubber material of different blend. In a case of using the rubber material of blend different from the rubber material of the matrix, a latex, emulsion or thermoplastic rubber can be used other than usual solid rubber as the rubber ingredient therefor. Among the rubber materials for adhesive, a chloro rubber material is used particularly preferably.

It is also extremely effective to coat the highly hard particles with a resin. In this case, effective resins are, for example, polyester, hydroxylated polyester, polyether polyol, polycaprolactone-polyol, hydroxylated polyester-polyisocyanate, epoxy resin, acryl resin, ethylene-vinyl acetate, phenol resin, tolylene diisocyanate, glycidyl ether of bisphenol A, polysiloxane, silicone resin, PVA (polyvinyl alcohol), PMMA (polymethyl methacrylate), polyvinyl acetate, polyacrylic acid, pitch, methyl methacrylate and styrene.

Further, in a case of coating the surface of the highly hard particles with the coating material as described above, the thickness (L) of the coating layer is preferably smaller than the diameter of the high hard particles (or the diameter of a sphere having an identical volume with that of an actual highly hard particle) ($L_O$) ($L \leqq L_O$), more preferably, $L \leqq \frac{1}{2} L_O$ and, further preferably, $L \leqq \frac{1}{4} L_o$.

The various kinds of coating methods described above may be applied solely or in combination of two or more of them, that is, the coating layer may be formed by two or more kinds of materials.

When the highly hard particles applied with such a surface treatment are blended to the rubber material in the present invention, one kind of particles may be used alone, or two or more kinds of highly hard particles, different in material, grain size and surface treatment from each other, may be used in combination.

Referring to the blending amount of the highly hard particles, a greater amount is preferred since this can provide higher frictional force with respect to the frictional coefficient on ice of the resultant rubber material. On the contrary, as the blending amount is increased, the abrasion resistance is deteriorated abruptly. Accordingly, a desired blending amount of the high hard particles in the present invention is, preferably, $2\% \leqq V_f \leqq 20\%$, more preferably, $3\% \leqq V_f \leqq 16\%$ and, most preferably, $4\% \leqq V_f \leqq 13\%$ in which $V_f$ represents a volume ratio of the highly hard particles in a rubber composition containing the highly hard particles (intrinsic volume ratio).

In the present invention, there is no particular restriction on the rubber composition as the matrix and usual rubber compositions may be used. Namely, usual rubber compositions comprising a rubber blended with various kinds of fillers, oils and vulcanizers can be used with no troubles at all, and desired products can be obtained by kneading the rubber material with the highly hard particles applied with the surface treatment, followed by vulcanization.

As described above, a first method of increasing the frictional force of tread rubber is to form a great number of pores in the tread rubber and the second method is a method of mixing highly hard particles. The present invention belongs to the second method and it is an object thereof to make the high frictional characteristics and the abrasion resistance compatible with each other, which has been considered to cause inevitable confliction between each other. For the phenomenon of increasing the frictional force of the rubber material, the first method and the second method are based on mechanisms different from each other and, accordingly, combined use of the first method with the method according to the present invention cause no problems at all but this is rather an effective method. That is, it will be effective to form pores in the rubber material by causing the rubber composition blended with the highly hard particles used in the present invention to blow or adding obstacles of poor adhesion, thereby developing the first mechanism and the second mechanism as described above simultaneously. However, it is also necessary to take a sufficient consideration for keeping the abrasion resistance.

As is well-known in order that the function, particularly, a dynamic function can be transmitted according to the theory in a mixing system, each of ingredients constituting the mixing system has to be bonded completely. That is, it is not exaggerated to say that the extent of the bond-ability between each of the ingredients constituting the mixing system determines the level for the performance and the function of the material.

Accordingly, in a rubber composition blended with the highly hard particles, it is an extremely important factor whether or not the highly hard particles mixed as a reinforcing material are intensely bonded with the matrix rubber, regarding both for the frictional characteristics and the abrasion resistance.

In the present invention, a coating layer having affinity to rubber is formed on the surface of highly hard particles with no bondability with the rubber material, for example, by a fluidized coating method using a special fluidized coating device as shown in FIG. 1, thereby improving the bondability with the rubber material and enabling to make the high frictional characteristics on ice and the abrasion resistance compatible with each other.

For the method of surface treatment of coating a material improving the bondability with the matrix rubber on the surface of the highly hard particles, various methods have been proposed so far such as dip/dying method or spray/drying method. However, the bondability between the high hard particles and the rubber material could not be improved by the method and it was impossible to make the frictional characteristics on ice and the abrasion resistance compatible with each other. This is because individual highly hard particles as the nuclei can not completely be coated with the coating material in the methods and, in addition, even when particles are sufficiently coated, bondability between the particles and the matrix rubber was insufficient because no firm coating material layer was formed on the surface of the particles.

That is, in the dip/drying method, particles are dipped in a coating solution, and an excess coating solution is removed, followed by drying. In this method, however, particles are tended to be coagulated with each other and it is more difficult to separate individual particles by destroying the coagulation as the coating material is more firm. In most cases, the coating material is destroyed in the separation step to expose particles, so that particles completely covered with the coating material could not be formed and, accordingly, no sufficient bondability with the matrix rubber could be ensured.

The spray/drying method can be said to be a method improved for the drying process in the coating method described above, in which particles dipped in the coating solution are sprayed together with the coating solution from a nozzle into a drying vessel at high temperature and the coating solution covering the surface of the particles is instantaneously dried to form a coating layer material. In this method, however, an excess coating solution is dried as it is upon injection to bring about a drawback that particles to be coated and particles of the coating material are mixed together, as well as a restriction that the coating solution for injection should have a low viscosity and highly flowability, which gives a limit on coating solution and the thickness of the coating material layer formed to the surface of the particles, so that no satisfactory coating can be applied for improving the bondability between the particles and the matrix rubber.

On the contrary, in the fluidized coating treatment according to the present invention, the problems can be solved, and a coating layer having affinity to rubber and capable of improving the bondability with the matrix rubber can be surely formed on the surface of the highly hard particles having no bondability with the rubber material and the highly hard particles can firmly be bonded to the matrix rubber, so that the high frictional characteristics on ice and the abrasion resistance of the rubber composition blended with the particles can be made compatible with each other.

According to the rubber composition of the present invention, there is provided a rubber material of excellent frictional characteristics on ice and also excellent abrasion resistance.

The rubber composition according to the present invention as described above is high useful industrially as a rubber material such as for tire treads or shoe soles.

Description will now be made more specifically to the present invention referring to examples and comparative examples.

EXAMPLE 1

Comparative Examples 1–3

Rubber compositions were prepared by blending 10% by volume of highly hard $SiO_2$ particles (grain size 150–300 mesh, Vickers hardness (Hv) 1100) applied with the surface treatment shown in Table 1 to a rubber material of the following formulation, and frictional coefficient on ice ($\mu$) and relative abrasion amount thereof were measured by the following methods and the results are shown in Table 1.

Comparative Example 1 shows results for a rubber composition not blended with the highly hard particles, and Comparative Example 3 shows results for a rubber composition blended with highly hard particles not applied with the surface treatment.

Formulation of Rubber material (phr)

Natural rubber (NR)=100

Carbon (HAF)=60

Stearic acid (StA)=3

Zinc oxide (ZnO)=5

Sulfur (S)=1.5

Measurement for Frictional Coefficient on Ice ($\mu$)

Figure 2:
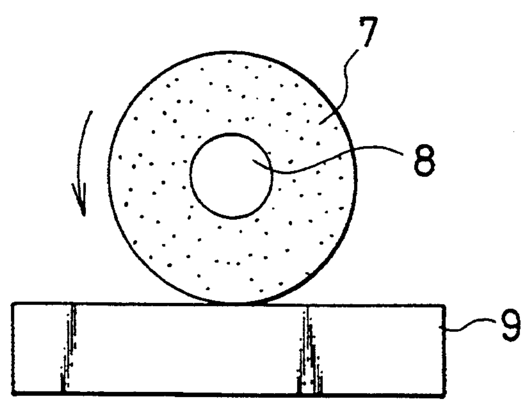
FIG. 2 an explanatory view illustrating a method of measuring the frictional coefficient on ice.

As shown in FIG. 2, a rubber specimen 7 having a size of 50 mm diameter and 10 mm thickness was rotated while being urged on stationary ice 9 by means of a setting bolt 8, and a frictional force generated upon rotation was detected by a road cell and a dynamic friction coefficient ($\mu$) was calculated.

Measurement was conducted at such a temperature (−2° C.) that a thin hydrous membrane was formed on an ice surface and the friction coefficient was reduced to minimum, at a pressure exerted on the surface=12 kg/cm$^2$ and a circumferential rotational speed of sample=200 cm/sec.

Measurement of Relative Abrasion Amount

The relative abrasion amount was measured for the same specimen as described above by using a Lambourn type room abrasion tester, at a room temperature, a surface pressure=9 kg/cm$^2$, slip ratio=60% and circumferential rotational speed of sample=50 cm/sec and it was indicated as a relative value assuming the amount in a case of Comparative Example 1 as 100.

TABLE 1

| Example | Working Example 1 | Comparative Example 1 | Comparative Example 2 | Comparative Example 3 |
|---|---|---|---|---|
| Highly hard particle | $SiO_2$ | — | $SiO_2$ | $SiO_2$ |
| Surface treatment | | | | |
| Coating method | Fluidized coating method | — | Dip/drying method | — |
| Coating layer thickness ($L/L_0$)* | 1/5 | — | 1/5 | — |
| Friction coefficient on ice ($\mu$) | 0.058 | 0.040 | 0.054 | 0.050 |

TABLE 1-continued

| Example | Working Example 1 | Comparative Example 1 | Comparative Example 2 | Comparative Example 3 |
|---|---|---|---|---|
| Relative abrasion amount | 130 | 100 | 170 | 250 |

*: ratio of the thickness L of the coat layer relative to diameter $L_0$ of the highly hard particle.

From Table 1, the followings can be seen.

Comparative Example 1 shows results for a rubber material of a basic formulation not containing highly hard particles, in which the friction coefficient on ice (u) was 0.04 and the abrasion amount was 100 (standard abrasion amount). In other examples. $SiO_2$ particles applied with different surfaces treatment were mixed by $V_f$=10.0% to the basic rubber material.

In Example 1, particles coated with chlorinated rubber adhesives by using the fluidized coating method were prepared and mixed. That is, $SiO_2$ particles were at first charged in a vessel 1 of a fluidized coating device shown in FIG. 1 and coated particles were prepared by a method of rotating a rotational disc 2 at the bottom of the vessel at 450 rpm and a rotational blade 3 at 450 rpm in the directions opposite to each other, supplying a hot blow at 60° C. at a flow rate of 0.45 m$^3$/min into the vessel to form a fluidized particle layer 4 and, subsequently, an adhesive solution was spray injected at 20 ml/min, thereby forming a coating layer of the adhesive in a predetermined amount. Then, the coated particles were mixed with the rubber material.

In Comparative Example 2, particles coated with an adhesive and dried by an existent dip/drying method were mixed. In Comparative Example 3, particles with no treatment were mixed.

It can be seen that particles of Example 1 have a higher friction coefficient on ice ($\mu$) and excellent abrasion resistance as compared with Comparative Example 2 and Comparative Example 3.

On the other hand, $SiO_2$ particles in Comparative Example 3 are not applied with surface treatment and have a small friction coefficient on ice ($\mu$) and extremely poor abrasion resistance.

The above-mentioned results show that the surface treatment for the highly hard particles in the present invention are extremely effective, both in view of the surface treatment material and the surface treatment method, for the improvement of the friction coefficient and the abrasion resistance.

It can be seen from the foregoing results that the rubber composition of the present invention in which highly hard particles formed with the coating layer having affinity to rubber by the fluidized coating method are blended is excellent both in the high frictional characteristics and abrasion resistance.

What is claimed is:

1. A rubber composition, comprising a rubber material, and highly hard particles dispersed in the rubber material, said highly hard particles being completely and uniformly coated on entire surfaces thereof with a coating layer having affinity with rubber, said coating layer comprising a material selected from a group consisting of an adhesive, a rubber material for adhesive and a resin and being coated by a fluidized coating treatment so that the highly hard particles are firmly coated individually with the coating layer free from coagulation thereof.

2. A rubber composition as defined in claim 1, wherein the highly hard particles comprise particles of ceramics, hard plastics or metals having a Vickers hardness of greater than 20.

3. A rubber composition as defined in claim 2, wherein the highly hard particles comprise particles of silica, $SiO_2$, or $Al_2O_3$.

4. A rubber composition as defined in claim 1, wherein the grain size of the highly hard particles is between 20 and 80 mesh.

5. A rubber composition as defined in claim 1, wherein the thickness of the coating layer is less than the diameter of the highly hard particles.

6. A rubber composition as defined in claim 1, wherein the highly hard particles are contained by 2 to 20% by volume in the rubber composition.

7. A rubber composition as defined in claim 1, wherein said fluidized coating treatment includes forming a layer in which the hard particles are raising and flowing without coagulation, and spraying a coating solution for forming said coating layer to the layer of said hard particles.

8. A rubber composition as defined in claim 7, wherein said coating layer is formed gradually on the surface of the particles.

9. A rubber composition as defined in claim 7, wherein said coating layer is formed of a first adhesive layer firmly bonding to said highly hard particles, and a second adhesive layer applied onto the first adhesive layer, said second adhesive layer firmly bonding to the first adhesive layer and the rubber material.

* * * * *